H. B. MEIER.
FEED HOPPER.
APPLICATION FILED NOV. 18, 1913.
1,107,088.
Patented Aug. 11, 1914.
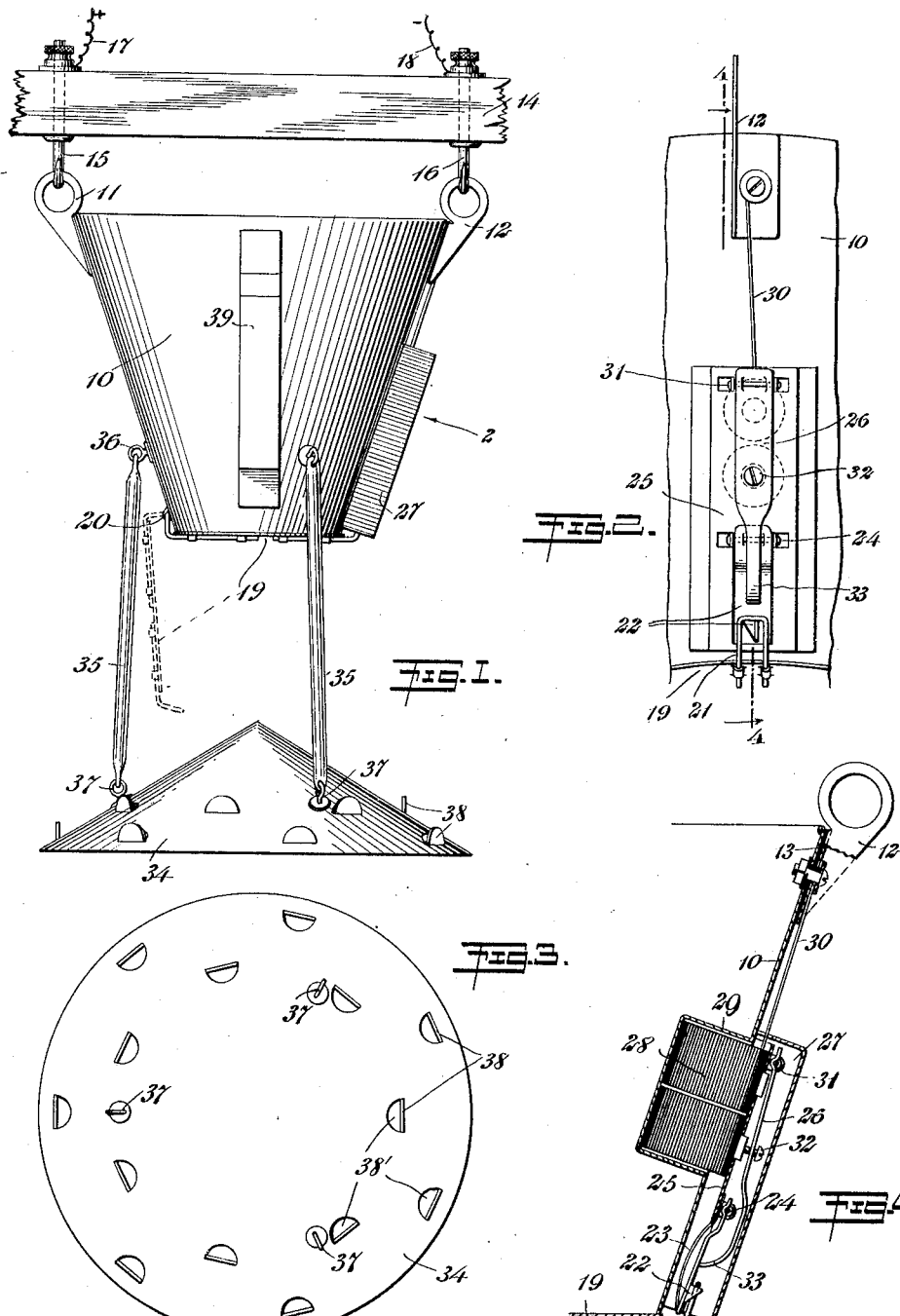
WITNESSES
G. Robert Thomas
Geo. L. Beeler
INVENTOR
Henry B. Meier
BY Munn & Co
ATTORNEYS

UNITED STATES PATENT OFFICE.

HENRY B. MEIER, OF PORT CHESTER, NEW YORK.

FEED-HOPPER.

1,107,088.   Specification of Letters Patent.   Patented Aug. 11, 1914.

Application filed November 18, 1913. Serial No. 801,642.

*To all whom it may concern:*

Be it known that I, HENRY B. MEIER a citizen of the United States, and a resident of Port Chester, in the county of Westchester and State of New York, have invented a new and Improved Feed-Hopper, of which the following is a full, clear, and exact description.

This invention relates to the care of live stock and has particular reference to devices of the character shown and claimed in Letters Patent of the United States for automatic time contact switches, No. 1,092,736, granted to me on the 7th day of April, 1914.

Among the immediate objects of this invention, however, is to provide an improved form of feed hopper which is adapted to be used either singly or in series with any number of similar devices and adapted to be discharged from a single time controlled mechanism, such, for instance, as that disclosed in my said patent or any other analogous means.

More specifically stated, the invention has reference to the form and construction of a feed container or hopper with novel means for maintaining its bottom in closed position until the predetermined time for the discharge of the feed.

The foregoing and other objects of the invention will hereinafter be more fully described and claimed and illustrated in the drawings forming a part of this specification in which like characters of reference indicate corresponding parts in all the views, and in which—

Figure 1 is a side elevation of the improvement in normal position; Fig. 2 is a fragmentary face view of the feed hopper as it would appear looking in the direction of the arrow 2 of Fig. 1; Fig. 3 is a plan view of the feed distributor; and Fig. 4 is a vertical section on the line 4—4 of Fig. 2.

The several parts of the device may be made of any suitable materials, and the relative sizes and proportions, as well as the general design of the mechanism, may be varied to a considerable extent without departing from the spirit of the invention hereinafter more fully set forth and specifically claimed.

In carrying out this invention in a practical embodiment adapting it for use in the feeding of poultry or the like, I provide a hopper 10 made preferably of metal, though by the provision of any suitable electric connections, such hopper might be made of fiber or any other material. Said hopper is provided with a pair of hangers or ears 11 and 12, one of which is connected directly to the wall of the hopper and the other of which is connected to the opposite wall or side of the hopper through insulation 13. This hopper is adapted to be removably supported upon any suitable fixed elevated support 14 by means of hooks 15 and 16 constituting the binding posts for electric circuit terminals 17 and 18 leading from any suitable source of electric energy.

The bottom 19 is hinged at 20 to the lower end of the hopper and is adapted to be held closed by means of a latch 21 coöperating with a catch 22 normally forced outwardly by means of a spring 23. The catch is pivoted at 24 at its upper end adjacent the upper end of the spring in the base plate 25 of the latch controller or actuator 26.

The latch mechanism is inclosed in a casing 27 secured on one side of the hopper and associated therewith is an electromagnet 28 extending into the interior of the hopper but guarded by a housing or casing 29. A wire 30 connects the insulated ear 12 to one end of the magnet and the other end of the magnet is grounded in the shell or casing constituting a part of the hopper body to which the ear 11 is directly connected. The circuit from the wire 17, therefore, may be traced through the hook 15, ear 11, hopper body 10, magnet 28, wire 30 and ear 12 to the wire 18. When the circuit is closed the magnet will be energized and will attract the actuator 26 as an armature. Said actuator is pivoted at 31 at its upper end and hangs normally pendent toward the outer side of the casing 27 due to the inclination of the casing 27 and the wall of the hopper to which said casing is connected. The intermediate portion of the actuator is guided and has free movement upon a stud 32 fixed to a portion of the magnet or the base 25. By this means the lower end or finger 33 of the actuator has certain engagement with the catch 22 to release it from the latch 21 when the magnet is energized. The form and arrangement of the casing 27 and the adjacent parts of the actuator and catch are such that when the magnet is deënergized, such parts will assume the position shown in Fig. 4, and hence the catch will be sure to coöperate with the latch 21 when the bottom 19 is closed. The spring 23 is certain also to make the catch effective to engage and hold the latch and bottom in closed position. It is to be noted also that the casing 27 constitutes an efficient guard to prevent accidental tripping of the latch and discharge of the feed carried by the hopper. Upon the energizing of the magnet at any predetermined time and through the means above described, a short movement of the actuator 26 acting as an armature will cause through the finger 33 and the catch 22, each acting as a lever of the third class, sufficient movement of the catch against the force of the spring 23 to release the latch and allow the bottom 19 to swing open under the force of gravity and the pressure of the material contained within the hopper.

I provide a distributer 34 substantially of the form shown in Figs. 1 and 3, preferably of conical form, and having its apex directly below the center of the hopper. The distributer is flexibly suspended beneath the hopper as by means of hangers 35 shown as three in number and connected at their upper ends at 36 to the hopper and at their lower ends at 37 to the distributer. As heretofore made, a conical distributer would cause the feed to be delivered to the ground so as to cover an annular space due to the fact that the feed would simply glide downwardly along the smooth inclined conical surface. In order, however, to make a substantially even distribution of the feed throughout the area bounded by a circle determined by the natural tendency of the cone to distribute the grain, I provide a series of barriers 38 formed, for instance, by striking up portions of the material of the distributer as shown in the drawings, the struck up portions thereof being arranged at the lower edges of the holes 38′ formed by so striking up the material. Said barriers are so distributed around the surface of the cone as to obstruct substantially one half of the feed gliding down over the distributer. These barriers, therefore, will stop or check the speed of the grain, some of which will drop through the holes 38′ while the bulk of it will be discharged over the edge of the distributer at varying distances from the center of the system. The portions of the grain which glide downwardly between the barriers will, of course, pass freely beyond the distributer and fall upon the ground at distances greatest from the center.

The hopper is provided with a handle 39 whereby it may be removed freely from its supporting hooks 15 and 16 for any purpose such, for instance, as resetting the bottom and refilling. By reason of the peculiar wiring and supporting connections, it will be observed that such removal of the hopper from its supports may be done independently of the electrical connections. This makes it easy for an attendant to care for a large number of pens of poultry at different places or at different times, and the removal of any hopper from its support for filling does not disturb any of the others nor interfere with the discharge subsequently of all of the hoppers from a single station. By providing for the easy removal of the hopper from an elevated support, I insure a much better distribution of the feed over a large area of the poultry yard than would ordinarily be possible if the feed hopper were supported in a position low enough to make it convenient for manipulation by other supporting means.

Having thus described my invention, I claim as new and desire to secure by Letters Patent:

1. The combination with an elevated stationary support including a pair of spaced hooks constituting binding posts for an electric current, of a metallic feed hopper including a pair of ears adapted to engage said hooks, one ear being connected directly to the hopper and the other being connected through insulation, said feed hopper having a movable bottom, means carried by the hopper to lock the bottom closed, and means to release said locking means, said releasing means including an electromagnet in circuit with said insulated ear and the hopper.

2. The herein described feeding device comprising a hopper having an inclined side wall and including a pivoted bottom adapted to swing open by gravity and forming, when in normally closed position, an obtuse angle with said side wall, and latch mechanism for the bottom, said latch mechanism including a catch pivoted at its upper end and lying substantially parallel to said side wall, means acting upon said catch tending to throw its lower end away from the wall for interlocking coöperation with a latch carried by the bottom, an actuator in the nature of a lever of the third class pivoted at its upper end and lying substantially parallel to the side wall and terminating at its lower free end in a finger turned toward the side wall and coöperating with said catch, and means acting upon the actuator to cause it to release the catch from the latch.

3. In a feeding device, the combination of a hopper having an inclined side wall and having a bottom adapted to open by gravity and forming, when in normally closed position, an obtuse angle with said side wall, said bottom also having a loop latch extending parallel to the side wall, a casing secured to the hopper wall and having an open lower end into which said loop latch extends, a catch pivoted at its upper end within the casing and coöperating with said latch, an actuator pivoted at its upper end within the upper end of the casing and having at its lower end a finger directed toward the hopper wall and coöperating with said catch, an intermediate part of the actuator being adapted to abut against the inner surface of the outer wall of the casing whereby the outward movement of the actuator and catch is limited, means to act upon the actuator to cause it to release the catch from the latch, and a fixed stud having loose guiding engagement with the middle portion of the actuator, substantially as set forth.

In testimony whereof I have signed my name to this specification in the presence of two subscribing witnesses.

HENRY B. MEIER.

Witnesses:
GEO. L. BEELER,
PHILIP D. ROLLHAUS.

Copies of this patent may be obtained for five cents each, by addressing the "Commissioner of Patents, Washington, D. C."